United States Patent [19]

Sun et al.

[11] 3,889,547

[45] June 17, 1975

[54] HYDRAULICALLY SELECTABLE GEAR TRANSMISSION

[76] Inventors: Jun-Kai Sun, 516 Dufferin St.;
 Lian-Sheng Lo, 182 Ossington Ave., both of Toronto, Ontario, Canada

[22] Filed: Sept. 13, 1973

[21] Appl. No.: 397,134

[52] U.S. Cl. .................. 74/336; 74/337.5; 74/369; 74/372; 74/858
[51] Int. Cl. .......................... F16h 5/60; F16h 3/08; B60k 41/04
[58] Field of Search .................... 74/371, 372, 681, 74/336, 730, 335, 337.5, 369, 858; 192/103 B

[56] References Cited
UNITED STATES PATENTS

| | | | |
|---|---|---|---|
| 1,508,193 | 9/1924 | Lord | 74/371 |
| 1,661,892 | 3/1928 | Girones | 74/371 |
| 2,005,822 | 6/1935 | Burrell | 74/371 |
| 2,275,046 | 3/1942 | Harris | 192/103 B |
| 3,099,925 | 8/1963 | Leonard | 74/372 |

*Primary Examiner*—Samuel Scott
*Assistant Examiner*—Lance W. Chandler

[57] ABSTRACT

The specification describes a gear transmission especially for automotive use having a larger number of gear ratios than usual provided in a smaller housing in such manner that the gears are not physically moved but wherein the drive shaft embodies a selector adapted to provide a drive connection between the drive shaft and a selected drive gear. Especially however the transmission of the invention provides for an automatic shift in gear ratio responsive to engine speed and load.

8 Claims, 8 Drawing Figures

PATENTED JUN 17 1975 3,889,547

SHEET 1

3,889,547

HYDRAULICALLY SELECTABLE GEAR TRANSMISSION

This invention relates to an automatic hydraulically actuated gear transmission adapted for automotive use.

In a conventional gear transmission the selectable engagement of a particular gear ratio is accomplished by physically shifting a gear into engagement with another. The design of the gear box must provide for sufficient room for the physical shifting or positioning of the gears for engagement or disengagement according to the selector programme accomplished by the gear shift lever and shift linkage.

According to this invention a more compact gear transmission having a larger number of gear ratios than usual may be provided in a smaller housing in such manner that the gears are not physically moved but wherein the drive shaft embodies a selector adapted to provide a drive connection between the drive shaft and a selected drive gear. Especially however the transmission of the invention provides for an automatic shift in gear ratio responsive to engine speed and load.

Other objects of the invention will be appreciated by a study of the following specification taken in conjunction with accompanying drawings.

Figure 1:
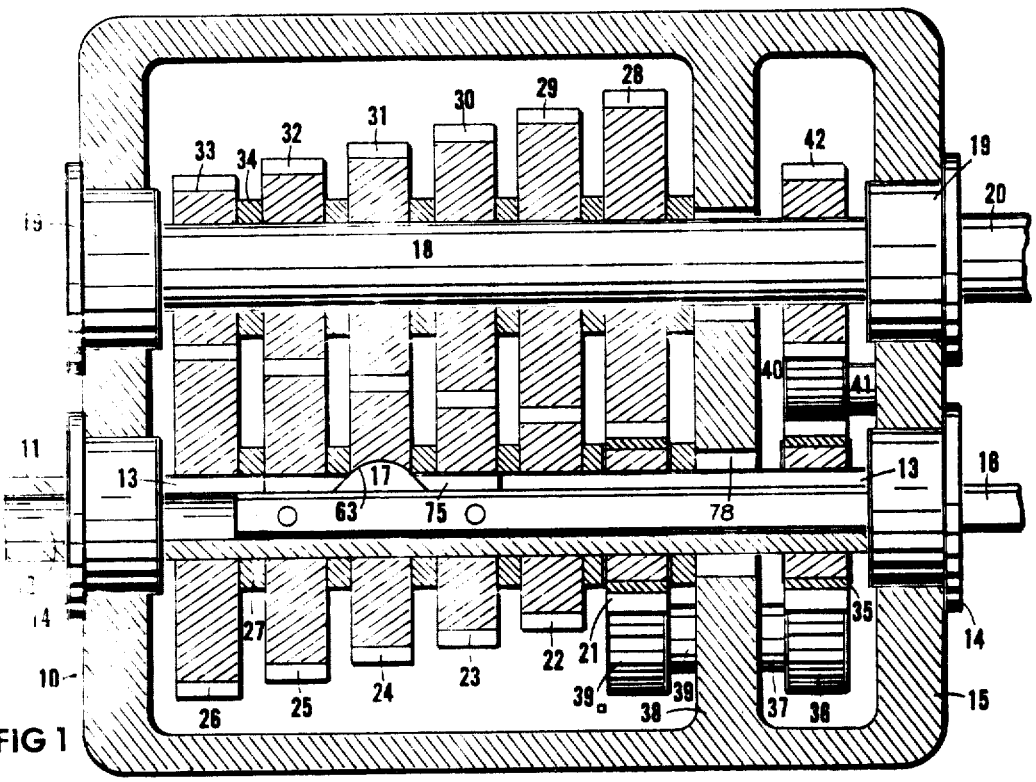
FIG. 1 is a sectional view of a gear transmission according to the invention, showing one position of the speed responsive hydraulic gear ratio selector within the drive shaft.
Figure 6:
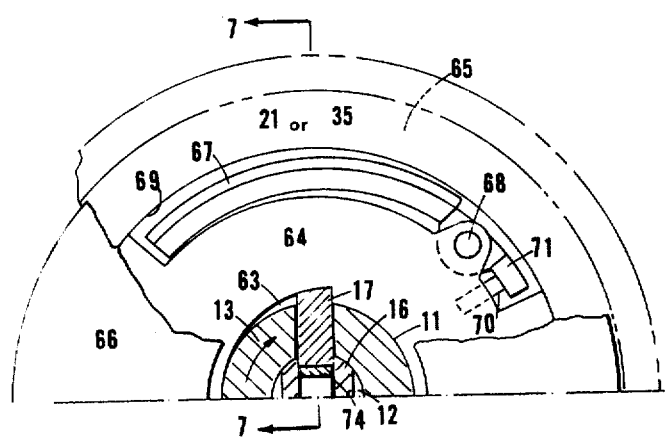
FIG. 6 is a sectional detail of the reverse drive gear on the line 6—6 of FIG. 7.
Figure 7:
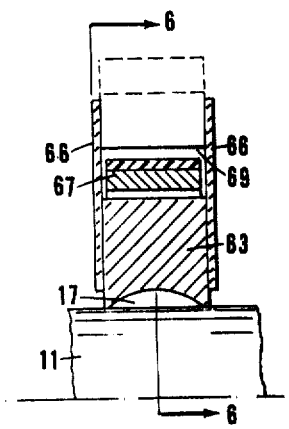
FIG. 7 is a section on the line 7—7 of FIG. 6.

In FIG. 1 a transmission 10 of the invention comprises main components somewhat similarly arranged but nevertheless quite different from the conventional shiftable gear transmission of the prior art. Thus a hollow drive shaft 11 having a through bore 12 and a longitudinal slot 13 is journalled by bearings 14 for rotation in transmission housing 15. Bore 12 accommodates a drive selector shaft 16 slidable therein and having a depressible drive key member 17 extending outwardly through slot 13. A driven shaft 18 is journalled in bearings 19 in housing 15 and has an output end 20 exterior of the housing. As many as six (or more drive gears), as by way of example, drive gears 21, 22, 23, 24, 25 and 26 are freely rotatable on drive shaft 11 being separated by suitable free running bushings 27 and at all times mesh with corresponding driven gears 28, 29, 30, 31, 32 and 33 separated by free running bushings 34. A speed responsive reverse drive gear 35 of the form of FIGS. 6 and 7 is supported by idlers 36 on stud shafts 37 in transmission divider wall 38. Also, the first drive gear 21 is speed responsive and is of the form of FIGS. 6 and 7 being supported by idler gears 39a and stud shafts 39 in wall 38. Reverse gear 35 meshes with transfer gear 40 mounted on stud shaft 41 in housing 15 in turn meshing with reverse driven gear 42 on shaft 18.

The drive ratio affected by the respective meshed gears on the drive and driven shaft is dependent upon the position of the selector drive key 17 longitudinally in drive shaft bore 12 which in turn is dependent upon both the speed of the engine and the position of the shift selector valve, the shift lever of which is available to the operator.

Figure 3:
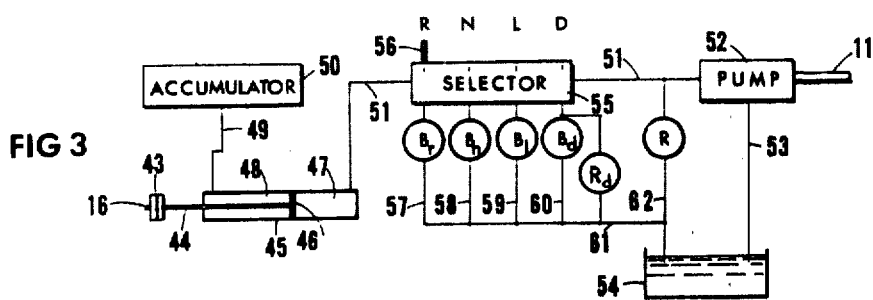
FIG. 3 is a diagrammatic view of a preferred hydraulic circuit adapted to position the selector of FIG. 2 responsive to both engine speed and position of the shift lever.
Figure 4:
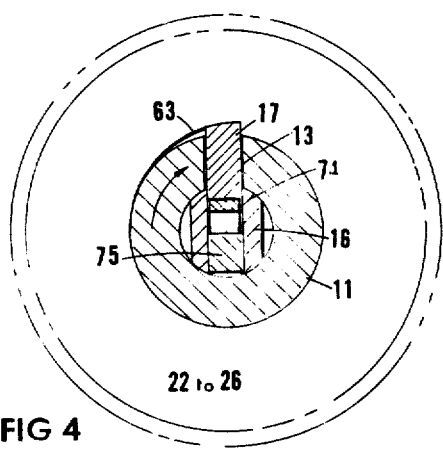
FIG. 4 is an enlarged sectional detail of a typical drive gear on the drive shaft of FIG. 1.
Figure 5:
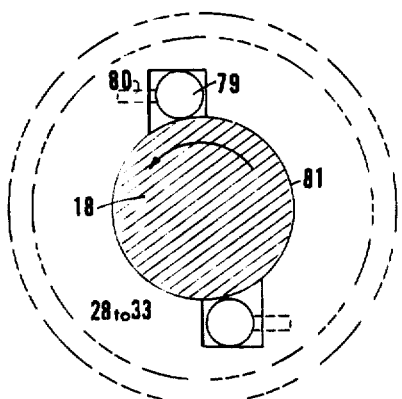
FIG. 5 is a view of a typical driven gear on the driven shaft of FIG. 1.

In FIG. 3 the selector actuator shaft 16 connects outside the transmission housing 15 to a freely rotatable connector thrust bearing 43 to nonrotatable actuator rod 44 of hydraulic cylinder 45 having a piston 46 slidable therein and fixed to the rod 44 to define an inlet chamber 47 and an outlet chamber 48 the latter being connected by hydraulic line 49 to accumulator gas or air containing chamber 50, hereinafter referred to as an accummulator and wherein the outlet chamber is filled with hydraulic fluid and the accumulator charged with air at slightly positive pressure (say 10 psi) in the withdrawn position of the piston 46 when the volume of the inlet chamber 47 is zero. Inlet chamber 47 of hydraulic actuating cylinder 45 connects by inlet line 51 extending from hydraulic pump 52 driven by motor drive shaft 11 pumping hydraulic fluid by line 53 from fluid sump 54 to line 51 at a rate of flow responsive to engine speed on shaft 11. Four-way drive selector valve 55 is actuated by manual selector lever 56 to distribute hydraulic fluid from line 51 selectively to by-pass lines 57, 58, 59 and 60 all commonly connected to hydraulic fluid return line 61 returning to sump 54 and each containing pressure control devices for the purpose of accomplishing the speed responsive shift selection apparatus curves of FIG. 8. Line 62 contains a restricting bleed valve R defining an initial pressure needle speed curve Q in FIG. 8.

Pressure, engine speed responsive shift, and gear selection is determined by the position of the piston 46 in cylinder 45 at which the pressure in accumulator 50 is equal to the pressure in line 51. Thus the position of piston 46 and the selector i.e., member 17 in drive shaft 11 of the transmission will be determined by the pressure in line 51. Thus first beginning with the position of the shift selector lever 56 to "R" for reverse, connecting by-pass line 51 to by-pass line 57, the latter line contains an open by-pass valve $B_r$ whereby line 57 represents a minimum resistance passage for hydraulic fluid to return to sump 54 by line 61. At this point the air pressure in accumulator 50 should be adjusted to a value equal to or slightly greater than the return pressure in line 61 due to flow resistance in the system whereupon the piston 46 will move to its furthermost retracted position at which drive key member 17 is positioned to engage reverse drive gear 35.

At zero engine speed i.e., when the motor is not running the piston 46 will be in its most retracted position because the pressure in line 51 will be at a minimum or zero and accordingly the hydraulic selector key 17 will be positioned for drive relationship with reverse gear 35.

Upon the engine being started key member 17 will engage in the arcuate key socket 63 of gear core 64 causing the latter to rotate clockwise at engine speed. No drive relationship will be imparted to the ring gear part 65 freely rotatable within the side plates 66 until centrifugal force causes the arcuate friction shoe 67 pivoted as at 68 to engage the inner clutch surface 69 of the outer ring gear 65 at a predetermined speed determined by the biasing spring 70 engaging arm 71 restraining outward motion of clutch shoe 67. If at this point it is assumed that the shift valve lever 56 is in position R for reverse drive then the drive would proceed in reverse through reverse idler 40 causing driven gear 42 to rotate clockwise, i.e., in the same direction as drive shaft 11. Reverse driven gear 42 is fixed to driven shaft 18 so that ring gear 65 of reverse drive gear 35 will rotate at any time driven shaft 18 is rotating. If desired, reverse driven gear 42 may be mounted on driven shaft 18 through a reversible free wheeling clutch mechanism of the Blackstock type (see U.S. Pat. No. 2,790,326 Apr. 30, 1957) by virtue of which driven gear 42 would be freely rotatable on shaft 18 except when driven by reverse gear 35 through drive pinion 40.

Figure 8:
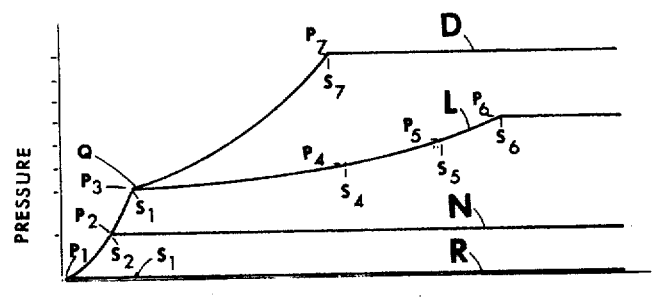
FIG. 8 is a trend curve of hydraulic selector pressure plotted against engine speed for different positions of the shift lever of FIG. 3.

Referring to FIG. 8, if the shift lever 56 is at the reverse position R represents the minimum pressure for all engine speeds or r.p.m. on shaft 11 but the reverse gears become engaged only at a centrifugal clutch speed of $S_1$.

Figure 2:
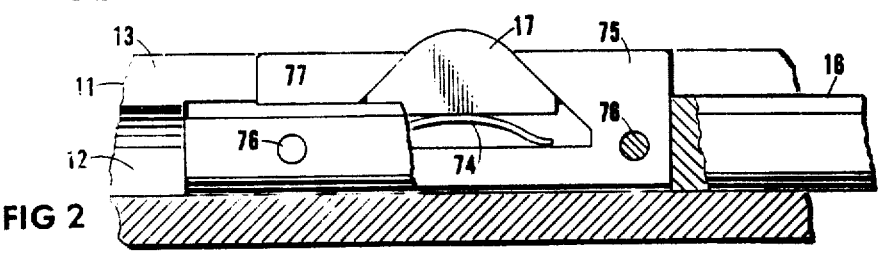
FIG. 2 is an enlarged view of the drive shaft selector of FIG. 1.

If the shift lever is in the neutral position the pressure will be allowed to rise in the line 51 to a value greater than minimum determined by the by-pass valve $B_n$ in line 58 limiting pressure in line 51 to a value no greater than a value $P_2$ defining curve N. Since however such value will be greater than the air pressure in accumulator 50, piston 46 advances from the retracted position, the piston thrust causing the depressable key member to move downwardly against leaf spring 74 in aperture plate 75 held by pin 76 in a through slot 77 in the end of actuator rod 16 (FIG. 2) to position the actuator rod and key 17 in gap 78 of wall 38. Notice that by-pass valve $B_n$ is required to be adjusted to a pressure of predetermined value equal to pressure in accumulator 50 for positioning in gap 78 enabling shaft 11 to be rotated at any r.p.m. without exceeding such predetermined pressure. At such predetermined pressure the actuator rod will not retract or advance and accordingly the actuator rod remains stationary at neutral position independent of engine speed except in the event the speed reduces to zero or the engine is turned off at which point the actuator rod retracts to the reverse position. In particular, however, $P_2$ for the neutral position is seen to occur at a speed $S_2$ for drive shaft 11, less than $S_1$ or clutch engaging speed $S_1$ of reverse gear 35. Accordingly if the idling speed in neutral is insufficient to maintain the pressure $P_2$ the reverse gear clutch will not be engaged at such speed and thus between pressures $P_1$ and $P_2$ there can be no drive relationship through the reverse gear train while in the neutral shift selector position N.

In the event the drive shift selector is in the "L" position or low drive position then bleed valve $B_1$ in line 59 being preferably of the needle resistance type will control the resistance to hydraulic fluid flow in line 59 to cause a rate of increase of pressure with engine speed advancing the selector key 17 to engage in the core 64 of the first drive gear 21 which when driven at speed $S_1$ achieves a pressure $P_3$ and engagement of centrifugal clutch mechanism 67 with the ring gear portion 65 of said first drive gear 21. As the engine speed increases beyond this point, the pressure will increase causing drive selector key 17 to advance to drive gear 22 at pressure $P_4$ and engine speed $S_4$ then to the next gear 23 at pressure $P_5$ and engine speed $S_5$, then to the next drive gear 24 at pressure $P_6$ and engine speed $S_6$, the latter however being the maximum value regardless of engine speed by reason of by-pass valve $B_1$ at $P_6$, $S_6$ of FIG. 8. Thus at the shift lever position to drive in low gear the selector or rod will move for drive selection among four gear ratios according to pressure in the accumulator again response to engine speed.

If the engine speed decreases for example, due to increase in engine load in climbing a hill or when stepping on brake pedal the actuator rod will retract to the next lower drive ratio because of reduction in engine r.p.m. causing a drop of pressure in line 51. Thus, under conditions of various loads there can be a change in gear ratio to accommodate the load conditions, and in which the hunting of the selector for the appropriate gear ratio does not arise in practise due to attendant mechanical friction. It is to be understood that the driven gears 28 to 33 on shaft 18 are free wheeling by virtue of free wheeling roller clutch devices 79 biased by suitable springs 80 in the conventional way whereby rotation driven shaft 18 in counterclockwise direction will be free running within each gear but wherein counterclockwise rotation of any gear 28 to 33 by its corresponding driven gear will trail the members 79 causing same to wedge against the outer surfaces 81 of shaft 18 driving the latter. If shaft 18 overruns the speed of any of the gears 28 to 33 no drive relationship will exist between the two. Likewise if the hydraulic selector key 17 is not engaged with a drive gear the latter will be freely rotatable on drive shaft 11. Thus only the drive gear selected and its driven gear will be in drive connection between the shafts 11 and 18 of the transmission and all other gears in said shafts (excepting reverse gears 42, 35) will be subject only to friction drag in their freely rotatable action. This contributes to a smoothness of shift by the selector from one drive gear to the next.

When the shift selector lever 56 is in the drive position D ' the selector is adapted to articulate between the drive gears 21 and 26. the first gear ratio at drive gear 21 corresponds to a pressure of $P_3$ on curve D achieved at a speed $S_1$ at which the position of selector 17 is determined by pressure in the accumulator 50 to locate same in engagement with drive gear 21.

At some higher engine speed, $S_7$ corresponding say to 40 m.p.h. a maximum pressure $P_7$ is achieved and controlled at a constant value at higher speeds by the by-pass valve $B_d$ but at a different rate of change of pressure with engine speed due to bleed valve $R_d$ shunting maximum pressure valve $B_d$ in line 60. Observe that in the drive position even the first drive gear 21 will be disengaged from the drive shaft by retraction of the selector at a speed less than $S_1$ which may conveniently be set at 10 m.p.h. vehicle speed. The selector will then on decreasing pressure and speed move to the low speed range and again on increasing speed will move up into the drive range without any attention to the shift lever by the operator.

If as may be preferred according to the invention, one or more of the driven gears 29 to 33 is fixed to shaft 18 for rotation therewith at all times, then advantage may be taken of engine drag for braking purposes according to engine speed but not at speeds below $S_3$. Thus it may be preferred to connect gears 29, 30, 31, 32 and 33 to shaft 18.

It will be evident that the number of drive gears available in the drive position may be increased to a large number in the transmission of the invention to provide overdrive gears if desired and which would be automatically selectable by the hydraulic selector disclosed according to engine speed which in the drive condition is a function of engine load giving rise to enhanced fuel economies.

The invention shows a unique combination for hydraulically selecting a gear pair ratio in a gear transmission having drive and driven shafts in parallel spaced apart relationship in a housing, the shafts carrying gear pairs of different drive ratios for transmitting drive from the drive shaft through a selected pair of gears to the driven shaft. The spacers 27 and 34 on the drive and driven shafts 11 and 18 rotatably mount the gears on the shafts in predetermined nonshiftable spaced apart positions in meshing relationship of each gear pair. As beforementioned the gears on the drive shaft at least are freely rotatable thereon while the driven gears on the driven shaft 18 may be fixed thereto or may be associated unidirectional clutches adapted to connect to the driven shaft when the driven gear is driven by a drive gear. The selector 17 is movable longitudinally of the drive shaft by the actuator rod 16 movable in coaxial relationship with the driven shaft. Selector key 17 when positioned to a drive gear being adapted to establish a mechanical drive relationship between the drive shaft and the drive gear by engagement of key 17 in key socket 63 of the drive gear. The outlet line 51 for the pump 52 delivers the pump fluid to the inlet chamber 47 of the cylinder 45. The return line 61 returns fluid from the outlet line to the sump by way of the pressure limiting devices $B_r$, $B_n$, $B_1$ and $B_d$ of different maximum pressure each of which defines a different position of piston 46 on cylinder 45 and having selector 17 relative to shaft 11 and the drive gears thereon.

What we claim as our invention is:

1. In a gear transmission having drive and driven shafts in parallel spaced apart relationship in a housing and gear pairs of different drive ratios for transmitting drive from said drive shaft through a selected pair of gears to said driven shaft, the combination for hydraulically selecting a gear pair ratio comprising: means on said drive and driven shafts rotatably mounting the gears thereof in predetermined non-shiftable spaced apart positions thereon in meshing relationship of each gear pair, the gears on said drive shaft at least being freely rotatable thereon; a selector movable longitudinally of said drive shaft and having an actuator rod coaxially connected thereto said selector when positioned at a drive gear being adapted to establish a mechanical drive relationship between the drive shaft and said drive gear; an hydraulic cylinder having an inlet chamber and an outlet chamber separated by a piston and a piston rod extending therefrom to position said actuator rod and the selector of said transmission drive shaft; a compressible gas containing accumulator for said outlet chamber; a fluid pump and means for driving same responsive to the speed of said drive shaft; an hydraulic fluid sump connected to said pump; an outlet line for said pump delivering pumped fluid to the inlet chamber of said cylinder; means returning fluid from said outlet line to said sump and limiting the pressure in said outlet line and said inlet chamber to a predetermined maximum equal to the pressure in said accumulator thereby to define a thus selected position of said piston together with said selector; means for returning fluid from said outlet line to said sump, each of said means limiting the pressure in said outlet line to different predetermined value; and a manually operable selector valve selectively connecting any one of said fluid returning means to said sump thereby defining the drive ratio of said transmission by the gear pair position of said selector.

2. The transmission of claim 1;
a reverse gear on said drive shaft separated from the nearest of the other gears thereon by a free gap adapted to accommodate said selector in a neutral position, said other gears defining different drive positions and being so arranged that the smallest diameter of said other gears is next said gap and the remainder progress larger in diameter along said shaft in further positions from neutral; and a speed responsive clutch in said reverse drive gear and in said first drive gear 3. The transmission of claim 1;
a reverse gear on said drive shaft separated from the nearest of the other gears thereon by a free gap adapted to accommodate said selector in a neutral position, said other gears defining different drive positions and being so arranged that the smallest diameter of said other gears is next said gap and the remainder progress larger in diameter along said shaft in further positions from neutral; a speed responsive clutch in said reverse drive gear and in said first drive gear; and means positioning said selector at the reverse gear of said drive shaft at zero engine speed and at the lowest maximum pressure position of said selector valve at all engine speeds.

4. The transmission of claim 1;
a reverse gear on said drive shaft separated from the nearest of the other gears thereon by a free gap adapted to accommodate said selector in a neutral position, said other gears defining different drive positions and being so arranged that the smallest diameter of said other gears is next said gap and the remainder progress larger in diameter along said shaft in further positions from neutral; a speed responsive clutch in said reverse drive gear and said first drive gear; and means positioning said selector at the free gap neutral position of said drive shaft at the next to lowest pressure position of said selector valve.

5. The transmission of claim 1;
a reverse gear on said drive shaft separated from the nearest of the other gears thereon by a free gap adapted to accommodate said selector in a neutral position, said other gears defining different drive positions and being so arranged that the smallest diameter of said other gears is next said gap and the remainder progress larger in diameter along said shaft in further positions from neutral; a speed responsive clutch in said reverse drive gear and in said first drive gear; means positioning said selector at a drive gear of predetermined diameter greater than that of said smallest diameter drive gear at a pressure position of said selector valve selecting a greater maximum pressure for said cylinder inlet chamber whereby at drive shaft speeds less than that obtaining said pressure said cylinder piston retracts to connect a drive gear of lesser diameter to said drive shaft responsive to drive shaft speed at outlet line pressures greater than said neutral position maximum.

6. The transmission of claim 1;
a reverse gear on said drive shaft separated from the nearest of the other gears thereon by a free gap adapted to accommodate said selector in a neutral position, said other gears defining different drive positions and being so arranged that the smallest diameter of said other gears is next said gap and the remainder progress larger in diameter along said shaft in further positions from neutral; a speed responsive clutch in said reverse drive gear and in said first drive gear; means positioning said selector at a drive gear of predetermined diameter greater than that of said smallest diameter drive gear at a pressure position of said selector valve selecting a greater maximum pressure for said cylinder inlet chamber whereby at drive shaft speeds less than that obtaining said pressure, said cylinder piston retracts to connect a drive gear of lesser diameter to said drive shaft responsive to drive shaft speed at outlet line pressures greater than said neutral position maximum, the said drive gear of predetermined diameter being the drive gear of maximum diameter of the drive gear series corresponding to a drive position for said valve selector connecting the highest maximum pressure return line of said plural means to said sump.

7. The transmission of claim 1;
a reverse gear on said drive shaft separated from the nearest of the other gears thereon by a free gap adapted to accommodate said selector in a neutral position, said other gears defining different drive positions being so arranged that the smallest diameter of said other gears is next said gap and the remainder progress larger in diameter along said shaft in further positions from neutral; a speed responsive clutch in said reverse drive gear and said first drive gear; and means positioning said selector at a drive gear of predetermined diameter greater than that of said smallest diameter drive gear at a pressure position of said selector valve selecting a greater maximum pressure for said cylinder inlet chamber whereby at drive shaft speeds less than that obtaining said pressure, said cylinder piston retracts to connect a drive gear of lesser diameter to said drive shaft responsive to drive shaft speed at outlet line pressures greater than said neutral position maximum, said drive gear of predetermined diameter being the drive gear of maximum diameter of the drive gear series corresponding to a drive position for said valve selector connecting the highest maximum pressure return line of said plural means to said sump, the number of drive gears being not less than six.

8. The transmission of claim 1 and one way clutches connecting certain of said driven gears to said driven shaft, the others of said driven gears being fixed to said driven shaft.

* * * * *